United States Patent
Tanaka et al.

(10) Patent No.: US 6,684,389 B1
(45) Date of Patent: Jan. 27, 2004

(54) COMPILER THAT DECRYPTS ENCRYPTED SOURCE CODE

(75) Inventors: Sadahiro Tanaka, Irvine, CA (US); Robert D. Wadsworth, Costa Mesa, CA (US); Yoshiki Uchida, Newport Beach, CA (US); Denny M. Lin, Fountain Valley, CA (US); Junichi Tanahashi, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,501

(22) Filed: Aug. 5, 1999

(51) Int. Cl.[7] .............................. G06F 9/45; G06F 9/44
(52) U.S. Cl. ...................................... 717/140; 717/162
(58) Field of Search .......................... 717/106, 136, 717/137, 140–167, 247, 139; 713/150–181, 200; 380/277–286, 1

(56) References Cited

U.S. PATENT DOCUMENTS

| | | | |
|---|---|---|---|
| 4,833,599 A | * 5/1989 | Colwell et al. | 364/200 |
| 5,123,045 A | * 6/1992 | Ostrovsky et al. | 380/4 |
| 5,339,419 A | * 8/1994 | Chan et al. | 395/700 |
| 5,343,527 A | * 8/1994 | Moore | 380/4 |
| 5,367,651 A | * 11/1994 | Smith et al. | 395/700 |
| 5,542,045 A | * 7/1996 | Levine | 395/186 |
| 5,604,905 A | * 2/1997 | Tevanian et al. | 395/706 |
| 5,724,425 A | * 3/1998 | Chang et al. | 380/25 |
| 5,815,715 A | * 9/1998 | Küçükçakar | 395/705 |
| 6,266,416 B1 | * 7/2001 | Sigbjørnsen et al. | 380/255 |
| 6,308,317 B1 | * 10/2001 | Wilkinson et al. | 717/139 |
| 6,374,402 B1 | * 4/2002 | Schmeidler et al. | 717/167 |
| 6,549,624 B1 | * 4/2003 | Sandru | 380/246 |

OTHER PUBLICATIONS

Free Software Foundation, Inc, The C Preprocessor. 1987 [retrieved Jun. 6, 2002]. Retrieved from the internet:<URL:http://gcc.gnu.org/onlinedocs/cpp> and <URL:http://gcc.gnu.org/onlinedocs/cpp/The–preprocessing–language.htm>.*

Alfred Aho, compilers, Principles, Techniques, and Tools, 1986, p. 5.*

Shave. Security Within Space Data Systems. IEEE. 1998. pp. 6/1–6/5.*

Yamazato et al. Interlace Coding System To Avoid Error Propagation of Source Coding Systems. IEEE. 1992. pp. 80–83.*

Yang et al., Managing Secure Communications Within Multilevel Security and Restricted Character Set Translation. IEEE. 1993. pp. 745–756.*

* cited by examiner

*Primary Examiner*—Wei Zhen
(74) *Attorney, Agent, or Firm*—Fitzpatrick, Cella, Harper & Scinto (57) ABSTRACT

A decrypting compiler that accepts encrypted source code from a software manufacturer, decrypts the encrypted source code into plain text that is not accessible outside the compiler, and compiles the decrypted source code into linkable binary objects. Because the decrypting compiler decrypts the encrypted source code such that the plain text is not accessible outside the compiler, trade secret and proprietary information from the source code is not easily learned by third-party software developers.

82 Claims, 6 Drawing Sheets

COMPILER THAT DECRYPTS ENCRYPTED SOURCE CODE

BACKGROUND OF THE INVENTION

1. Field of the Invention

The present invention relates to a decrypting compiler that accepts encrypted source code, decrypts the encrypted source code into plain text that is not available outside the compiler, and compiles the decrypted source code into a linkable object.

2. Description of the Related Art

In today's environment for software development, it is common for a software manufacturer to market software libraries to third-party software developers. The third-party software developers, in turn, use the libraries to write special purpose and customized application programs that are distributed to end users. As an example, a software manufacturer might develop a software library that includes functions to interface to hardware such as a digital camera or a printer. The software manufacturer supplies the software library to a third-party software developer, who might use the software library to develop a customized camera or printer application. The developer then compiles his customized code, together with the software library provided by the software manufacturer, so as to produce an executable application program that is then distributed to end users.

One problem encountered in such an arrangement arises from the existence of trade secret and other proprietary information that might reside in the software manufacturer's library. Because of the existence of trade secret and proprietary information, it is rare for a software manufacturer to supply source code for its software library. In particular, in a case where source code for the software library is provided to third-party developers, those third-party developers could easily learn of the trade secret and proprietary information from such source code. For this reason, most software manufacturers simply do not supply source code to third-party developers. Rather, what is supplied to third-party developers is a pre-compiled and linkable object which the third-party developer links with his customized code. Because source code is not supplied, the trade secret and proprietary information cannot be learned by the third-party developer.

Figure 9:
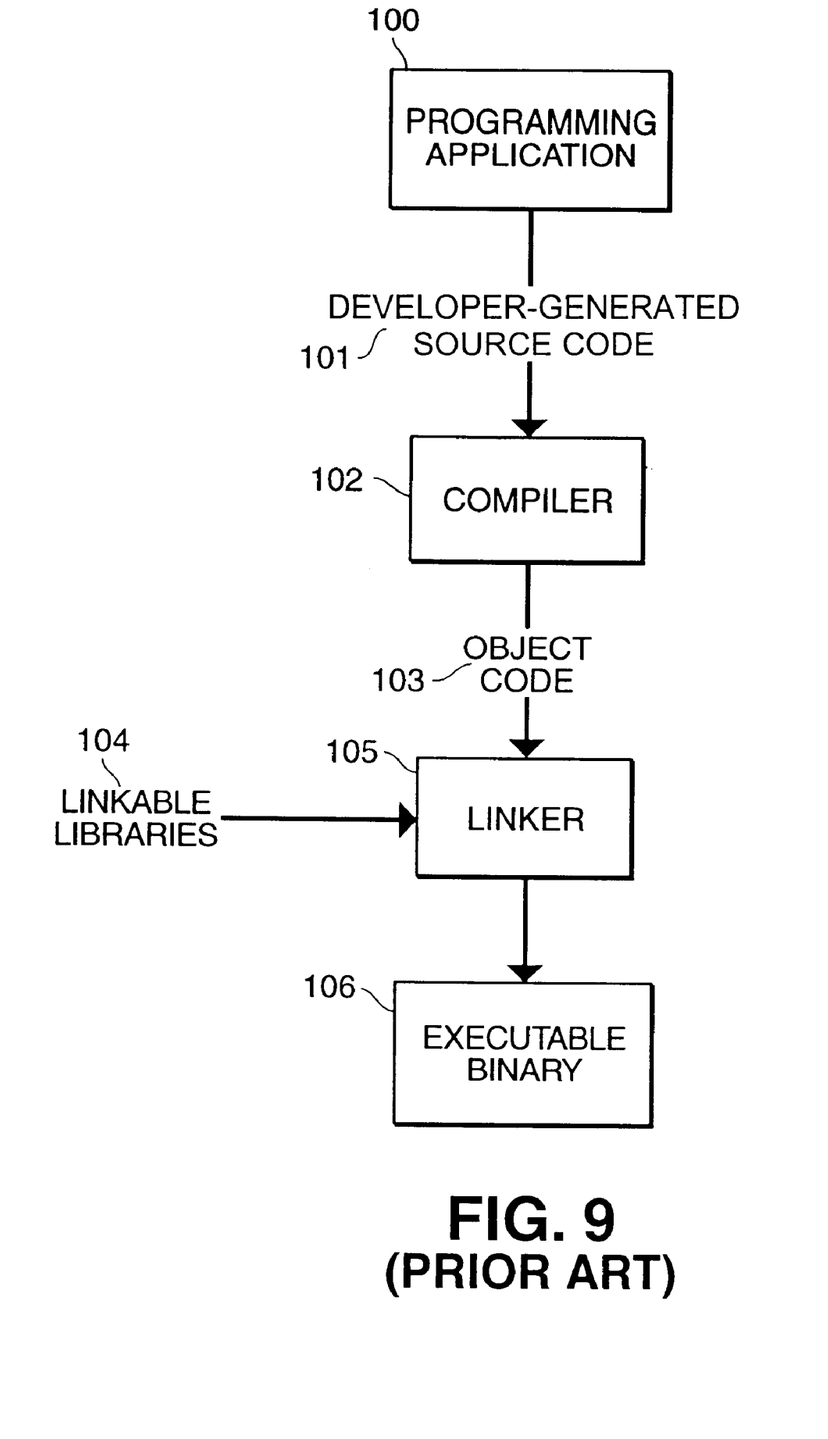
FIG. 9 illustrates creation of an executable according to conventional methods.

For example, as shown in FIG. 9, a third-party developer uses programming application 100 to generate developer-generated source code 101. This developer-generated source code is compiled by compiler 102, and resulting object code 103 is linked to linkable libraries 104 by linker 105 to create executable binaries 106. Linkable libraries 104 are supplied to the developer; however, in order to protect proprietary information therein, no source code is provided for the libraries.

The solution of providing pre-compiled linkable objects is not satisfactory, however, particularly when there are many different target platforms for the library. The reason that this solution is not satisfactory, is that the pre-compiled library must be compiled by the software manufacturer for each different target platform, making version maintenance and cross-platform compatibility complicated.

SUMMARY OF THE INVENTION

It is an object of the invention to provide a different solution to distribution of software libraries, that eases version maintenance and cross-platform compatibility problems, while at the same time protecting trade secret and proprietary information that might be contained in the software library's source code.

In one aspect, the invention is a decrypting compiler that accepts encrypted source code, and decrypts the encrypted source code into plain text that is not accessible outside the compiler. According to the invention, rather than providing plain-text source code for its software libraries, the software manufacturer instead provides encrypted source code. Since the source code is encrypted, third-party software developers cannot learn of proprietary and trade secret information contained in the source code. At the same time, because the compiler is working with source code, as opposed to a linker working with a pre-compiled linkable object, version maintenance and cross-platform compatibility is simplified. That is, with a decrypting compiler according to the invention, and with the software manufacturer providing encrypted source code rather than pre-compiled linkable objects, it is possible for the software manufacturer to provide only a single version of its software library, leaving to the compiler its usual responsibility of turning out different versions for each different target platform.

The decrypting compiler preferably uses a proprietary single-key encryption/decryption algorithm so that third-party software developers cannot learn of decrypted plain text source code. Alternatively, public key/private key encryption can be employed, with the private key being embedded in the decrypting compiler. Either way, the decrypting compiler decrypts the encrypted source code such that decrypted plain text for the source code is not accessible outside the compiler.

Further preferred embodiments of the decrypting compiler accept a parameter or parameters from the third-party software developer, with the parameters corresponding to one of plural different possible target platforms. By supplying the decrypting compiler with parameters that specify characteristics of a particular target platform, the decrypting compiler is able to compile different sections of the decrypted source code (through use of standard #if and #endif compiler directives) so as to tailor the compiler's output for the target platform. For example, the compiler's output could be tailored for a target platform having a particular processor such as a very long instruction word (VLIW) processor, based on parameters specifying a cluster type of the processor, register partitioning information for the processor, and the like.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
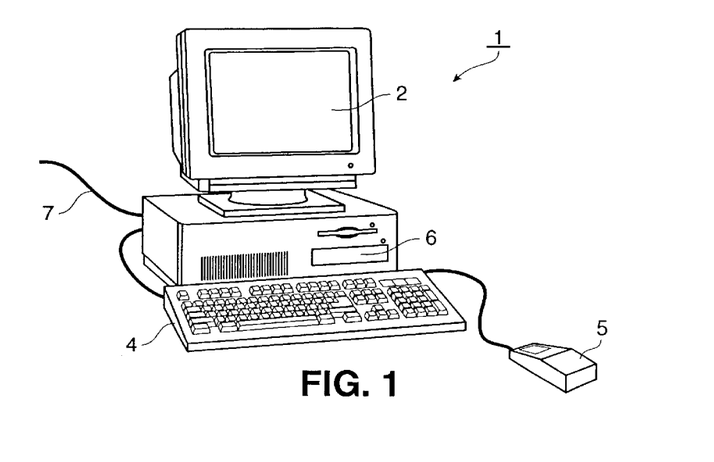
FIG. 1 is a representational view of a computer system in which a decrypting compiler according to the invention may be utilized.

FIG. 1 is a representational view of a computer system, such as a computing system used by a third-party software developer, in which a decrypting compiler according to the invention may be utilized. Computer system 1 may be a Macintosh, PC-compatible, or other type of system having an operating system which preferably is a windowing operating system, such as Microsoft Windows NT®, but which also may be a non-windowing operating system such as DOS or UNIX. In the preferred embodiment, computer system 1 is a Pentium®-based computer system using Microsoft Windows NT®.

Provided with computer system 1 are display 2, which may be a color monitor, keyboard 4 for entering user commands and source code, and a pointing device such as mouse 5 for pointing to and manipulating graphical user interfaces and other objects displayed on display 2.

Computer system 1 also includes a computer-readable storage medium such as a mass storage device like fixed disk 6. The computer-readable storage medium stores computer-executable process steps and data according to the invention, as explained in more detail below with reference to FIG. 2. The storage also may be provided by a writable CD-ROM (not shown) or the like.

Network interface 7 is optionally provided for receiving data, such as encrypted source code according to the invention, from other computer systems or networks. For example, such data can be received from another computer across the World Wide Web, or from a fileserver in a local area network that supports a team software development effort.

Figure 2:
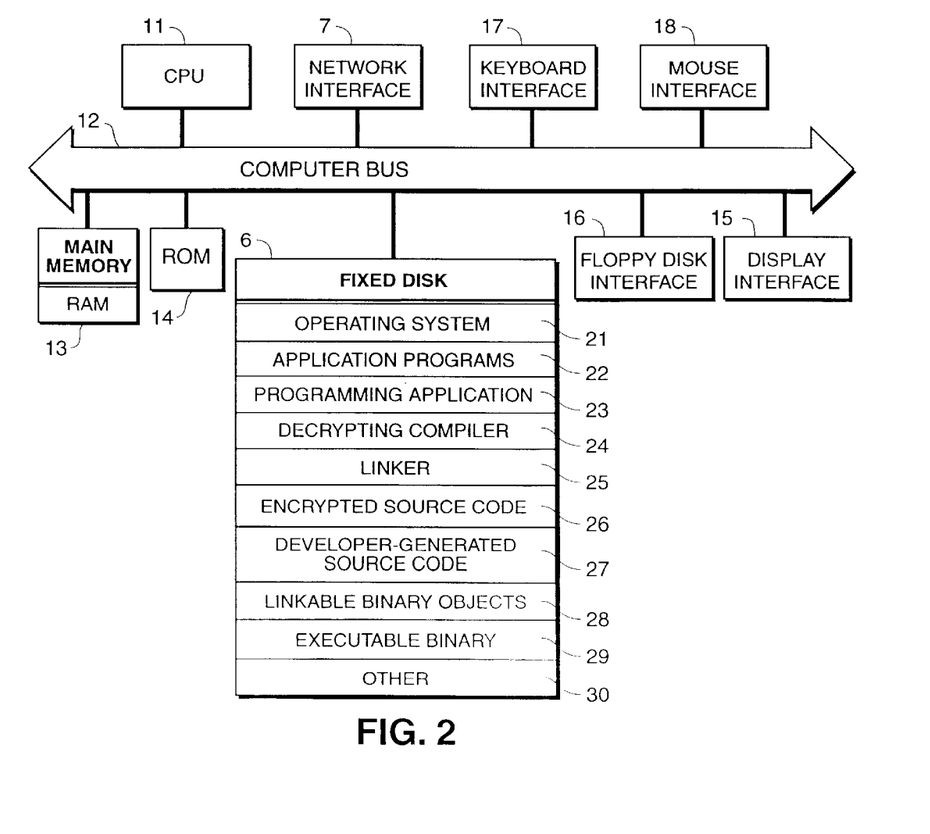
FIG. 2 is a detailed block diagram showing the internal architecture of the computer system shown in FIG. 1.

FIG. 2 is a detailed block diagram showing the internal architecture of computer system 1. As shown in FIG. 2, computer system 1 includes central processing unit (CPU) 11, which interfaces with computer bus 12. Also interfacing with computer bus 12 are fixed disk 6, main memory (RAM) 13, read-only memory (ROM) 14, display interface 15, floppy disk interface 16, keyboard interface 17, mouse interface 18, and network interface 7.

Fixed disk 6 preferably stores executable process steps for operating system 21, application programs 22, programming application 23, decrypting compiler 24 according to the invention, and linker 25, as well as encrypted source code 26 written by a software manufacturer, developer-generated source code 27 written by a third-party software developer, linkable binary objects 28, executable binary 29, and other programs and data 30. Such storage also may be provided by a writable CD-ROM (not shown) or the like.

Main memory 13 interfaces with computer bus 12 so as to provide RAM storage to CPU 11 during execution of software applications such as a decrypting compiler according to the invention. More specifically, CPU 11 loads process steps from a computer-readable medium such as fixed disk 6 or some other source such as a network into main memory 13. CPU 11 then executes the stored process steps from main memory 13 in order to execute applications such as programming application 23, decrypting compiler 24 according to the invention, and linker 25. Data, including encrypted source code 26, developer-generated source code 27, linkable binary objects 28, and executable binary 29, can be stored in main memory 13 or some other writable memory medium. If the data is stored on a mass storage device such as fixed disk 6, that data can be accessed by CPU 11 through well-known disk-swapping techniques.

Programming application 23 is an application program used by a third-party developer to author source code, and in particular to author developer-generated source code 27. For example, application program 23 can be a software development package for authoring C++source code.

Decrypting compiler 24 compiles encrypted source code 26 and developer-generated source code 27, resulting in linkable binary objects 28, as explained in more detail below with reference to FIGS. 6 and 7. Linker 25 links linkable binary objects 28 so as to generate executable binary 29, also as explained in more detail below with reference to FIGS. 6 and 7. Executable binary 29 preferably runs on a target system such as the target system illustrated in FIG. 5.

Figure 3:
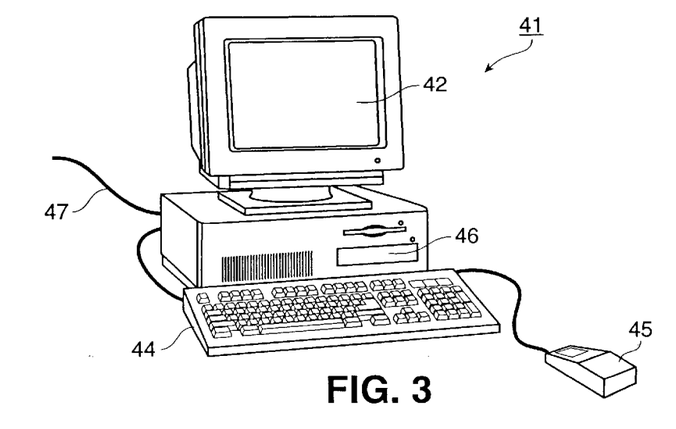
FIG. 3 is a representational view of a computer system for generating encrypted source code according to the invention.

FIG. 3 is a representational view of a computer system for generating encrypted source code according to the invention. Computer system 41 may be of the same type as computer system 1 shown in FIG. 1, or computer system 41 may be of an entirely different type. Thus, computer system 41 may be a Macintosh, PC-compatible, or other type of system having an operating system which preferably is a windowing operating system. In the preferred embodiment, computer system 41 also is a Pentium®-based computer system using Microsoft Windows NT®.

Provided with computer system 41 are display 42, which may be a color monitor, keyboard 44 for entering user commands and source code, and a pointing device such as mouse 45 for pointing to and manipulating graphical user interfaces and other objects displayed on display 42.

Computer system 41 also includes a computer-readable storage medium such as a mass storage device like fixed disk 46. The computer-readable storage medium stores computer-executable process steps and data, as explained in more detail below with reference to FIG. 4. The storage also may be provided by a writable CD-ROM (not shown) or the like.

Network interface 47 is optionally provided for sending data, such as encrypted source code according to the invention, from computer system 41 to other computer systems such as computer system 1 shown in FIG. 1. The data is sent, for example, across a local area network or across a network such as the World Wide Web.

Figure 4:
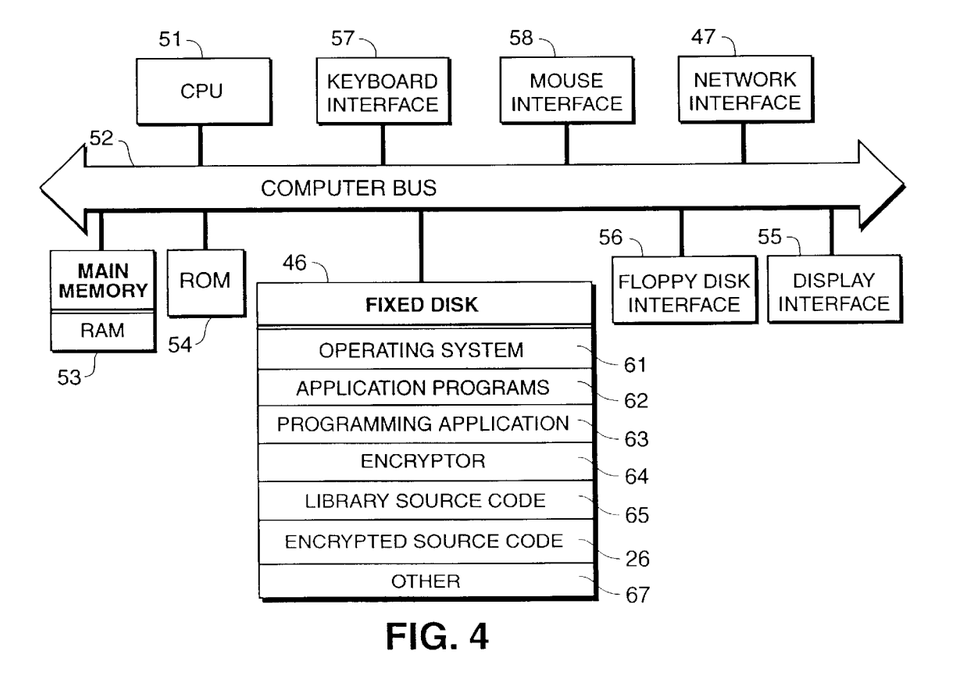
FIG. 4 is a detailed block diagram showing the internal architecture of the computer system shown in FIG. 3.

FIG. 4 is a detailed block diagram showing the internal architecture of computer system 41. As shown in FIG. 4, computer system 41 includes central processing unit (CPU) 51, which interfaces with computer bus 52. Also interfacing with computer bus 52 are fixed disk 46, main memory (RAM) 53, read-only memory (ROM) 54, display interface 55, floppy disk interface 56, keyboard interface 57, mouse interface 58, and network interface 47.

Fixed disk 46 preferably stores executable process steps for operating system 61, application programs 62, programming application 63, and encryptor 64, as well as library source code 65, encrypted source code 26 according to the invention, and other programs and data 67. Such storage also may be provided by a writable CD-ROM (not shown) or the like.

Main memory 53 interfaces with computer bus 52 so as to provide RAM storage to CPU 51 during execution of software applications such as a programming application and an encryptor according to the invention. More specifically, CPU 51 loads process steps from a computer-readable medium such as fixed disk 46 or some other source such as a network into main memory 53. CPU 51 then executes the stored process steps from main memory 53 in order to execute applications such as programming application 63 and encryptor 64 according to the invention. Data, including library source code 65 and encrypted source code 26, can be stored in main memory 53 or some other writable memory medium. If the data is stored on a mass storage device such as fixed disk 46, that data can be accessed by CPU 51 through well-known disk-swapping techniques.

Programming application 63 preferably is a software development tool used to generate library source code 65 for use by software developers. Library source code 65 preferably includes compilation statements whereby different source code is provided for use with different target processors, as explained in more detail below with reference to FIG. 7.

Encryptor 64 encrypts library source code 65 into encrypted source code 26, as explained in more detail below with reference to FIGS. 6 and 7. This encrypted source code preferably is provided to computer system 1, for example, through network interfaces 47 and 7, so as to provide encrypted library source code for use by third-party software developers in developing executable binaries for various target systems.

Figure 5:
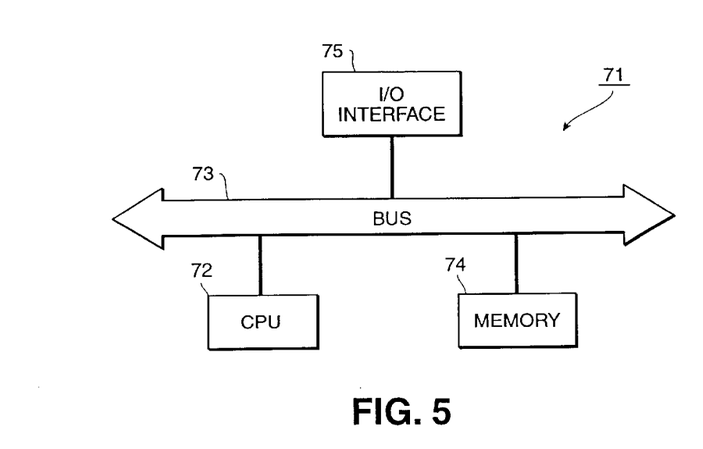
FIG. 5 is a block diagram showing the internal architecture of a target system for which executable binaries are created according to the invention.

FIG. 5 is a block diagram showing the internal architecture of a target system for which executable binaries are created according to the invention. Target system 71 preferably is a multi-media processor or embedded system, such as a system for controlling a multimedia presentation system or a set-top box.

Target system 71 preferably includes CPU 72 interfaced to bus 73. CPU 72 preferably is a very long instruction word (VLIW) processor, possible with multiple processing clusters (e.g., multiple integer units and multiple floating point units). With such cluster-type CPUs, each different cluster version can require a different binary executable file built from a command set particular to the cluster version. For example, a target system with a CPU having two processing clusters can require different binary code than a target system with a CPU having three processing clusters. In addition, different processors can operate using differently-partitioned registers. The present invention allows a third-party software developer to write source code for target system 71 and then compile the source code, along with appropriate library functions contained in encrypted source code 26 provided by a manufacturer, so as to accommodate these variations in CPU types, as explained in more detail below with reference to FIGS. 6 and 7.

Also preferably interfaced with bus 73 are memory 74, which preferably stores executable binary 29, and input/output interface 75 for interfacing target system 71 with other devices. Examples of such other devices include, for input, another computer system or network, a keyboard, or a remote-control device. For output, examples of such devices include a television screen or computer monitor, or an audio output device.

Figure 6:
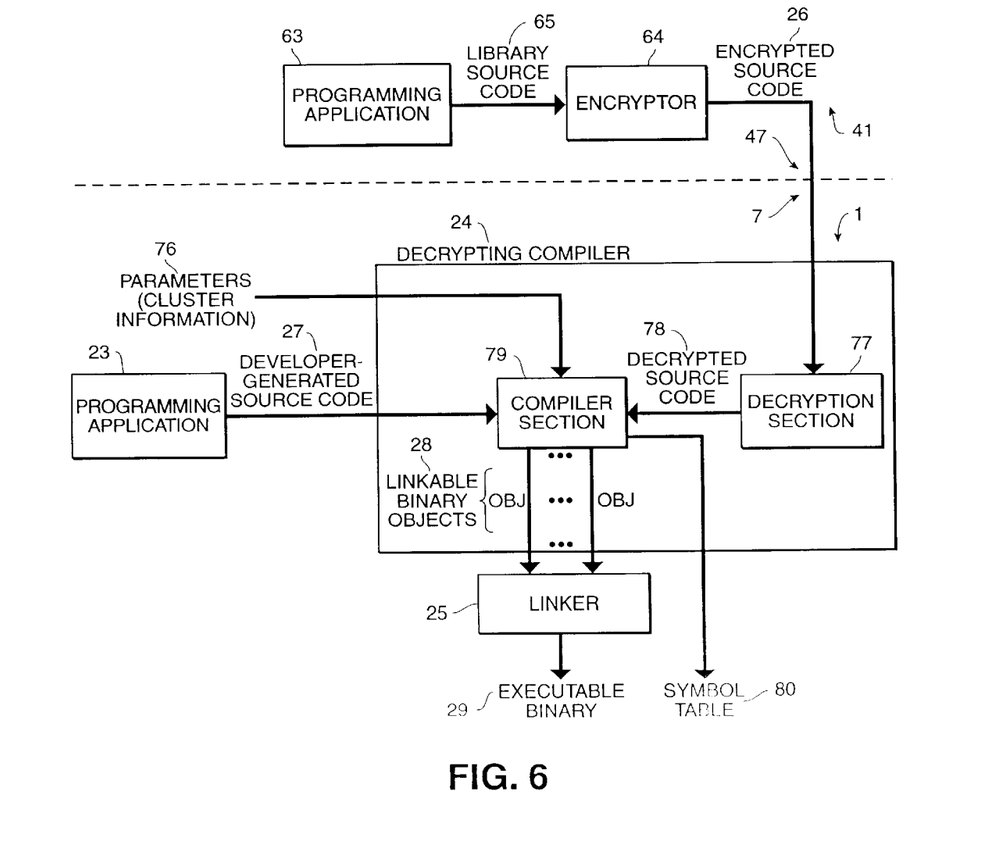
FIG. 6 is a representative view illustrating generation of an executable binary file for a target system according to the invention.

FIG. 6 is a representative view illustrating generation of executable binary files for a target system according to the invention.

In FIG. 6, a dashed line separates processes that preferably are performed by a manufacturer using computer system 41 (top) from processes that preferably are performed by a third-party software developer using computer system 1 (bottom).

According to the invention, a manufacturer uses programming application 63 to generate library source code 65. This source code includes conditional compilation statements which can be used to customize compilation of the source code for one of plural different types of processors, as explained in more detail with reference to FIG. 7.

Library source code 65 is input to encryptor 64, and encryptor 64 outputs encrypted source code 26. In the preferred embodiment, encryptor 64 uses either a single-key encryption algorithm or a public/private encryption algorithm. Examples of single-key encryption algorithms include DES, triple DES, IDEA, and proprietary single-key encryption algorithms. Examples of public/private key algorithms include the well-known RSA encryption algorithm.

In the case that encryptor 64 uses a public/private key encryption algorithm, the library source code is encrypted using the public key. Advantageously, this allows the public key to be used by plural different manufacturers to generate encrypted source code. This is particularly useful when several manufacturers have developed libraries for a particular target platform (e.g., the manufacturers have developed the platform jointly or have developed the platform in accordance with a set of standards, but have each developed their own software libraries for the platform). Because the source code can then only be decrypted using the private key which corresponds to the public key, and because this private key is shielded by decrypting compiler 24, the security of any proprietary information in the encrypted source code is ensured.

The encrypted source code is provided to computer system 1 for use by a third-party software developer in generating executable binary 29. For example, as shown in FIG. 6, encrypted source code 26 can be sent though network interface 47 of system 41 to network interface 7 of computer system 1. Alternatively, the encrypted source code can be transferred on a removable storage medium such as a CD-ROM.

The software developer uses programming application 23 to author developer-generated source code 27, which is plain text source code. This developer-generated source code utilizes functions provided by the manufacturer in encrypted source code 26. The third-party developer writes calls to these functions using names and parameters provided by the manufacturer. The names and parameters typically do not reveal implementation details (i.e., source code) for the library functions. Thus, the code written by the third-party developer can utilize the functions, without the developer ever having access to plain text for encrypted source code 26.

Developer-generated source code 27 is input to decrypting compiler 24, along with encrypted source code 26 from computer system 41. One or more parameters 76 provided by the third-party developer in accordance with a designated target system also are input to decrypting compiler 24. These parameters preferably specify a CPU-type of target system 71. The decrypting compiler generates linkable binary objects 28 from these inputs.

Briefly, a decrypting compiler according to the invention includes a first input section for inputting encrypted source code which preferably contains proprietary information, a second input section for inputting plain text source code, and a decrypting section that decrypts the encrypted source code into plain text decrypted source code. The decrypted source code is not accessible outside the decrypting compiler. The decrypting compiler according to the invention also includes a compiling section that compiles the plain text input by the second input section and the plain text source code decrypted by said decrypting section, so as to produce linkable binary objects.

Preferably, a linker links the linkable binary objects produced by the compiler section so as to produce an executable. The decrypting compiler preferably is responsive to compiler directives keyed to an input parameter so as to selectively compile different sections of source code. The compiler preferably further includes a parameter input section for inputting a parameter for selective compilation of the decrypted plain text.

In more detail, decryption section 77 of decrypting compiler 24 decrypts encrypted source code 26 using an appropriate key. If encryptor 64 utilizes a single-key encryption algorithm, then decryption section 77 utilizes the same key as was used by encryptor 64 to encrypt encrypted source code 26. If encryptor 64 utilizes a public/private key algorithm, then decryption section 77 utilizes the private key corresponding to the public key used by encryptor 64.

Decrypted source code 78 is fed to compiler section 79, along with developer-generated source code 27 and parameters 76. Preferably, the decrypted source code is not swapped out to a mass storage device, such as fixed disk 6, during this operation. Instead, the decrypted source code preferably resides solely in main memory 13 of computer system 1, thereby limiting access to the decrypted source code.

Compiler section 79 compiles developer-generated source code 27 with decrypted source code 78 from decryption section 77 so as to generate linkable binary objects 28. Compiler section 79 utilizes parameters 76 so as to selectively compile portions of decrypted source code 78, as explained in more detail below with reference to FIG. 7.

The linkable binary objects may be swapped out to a mass storage device during compilation, if necessary. Because these objects are in binary form, proprietary source code information is still protected. For added security, however, linkable binary objects 28 can be stored entirely in main memory 13, if sufficient memory is provided.

Linker 25 preferably links linkable binary objects 28 so as to generate executable binary 29 for a particular target system 71. Compiler section 79 preferably also generates symbol table 80 for use in debugging executable binary 29.

Figure 7:
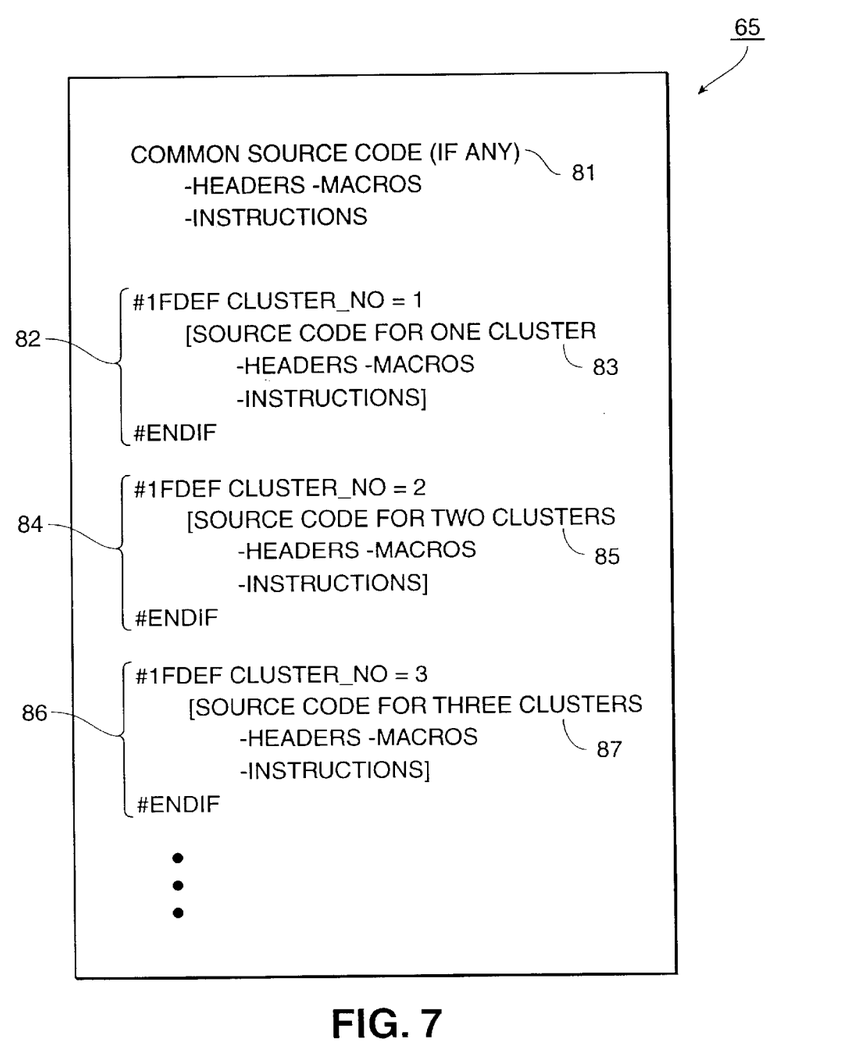
FIG. 7 shows library source code, which is equivalent to a plain-text view of encrypted source code provided by a manufacturer, including conditional compilation statements.

FIG. 7 shows library source code 65, which is equivalent to a plain-text view of encrypted source code 26. The library source code can be contained in a single file, or in many files of different types. For example, in the case of a C-language library, the library source code can be contained in one or more .h, .c and/or macro files.

In FIG. 7, library source code 65 includes common source code 81, which preferably includes common source code and compiler directives such as source code statements that are common to many possible target systems. These statements can include, for example, header information, macros (possibly contained in the header information), instructions (e.g., variable assignments, control flow instructions, conditional statements, etc.), and the like.

Conditional compilation sections allow conditional compilation of different sections of the encrypted source code in dependence on parameters specifying target platforms. These different sections can contain different header information, macros, instructions, and the like appropriate for the target platform. Examples of conditional compilation statements are #ifdef/#endif pairs.

For example, in FIG. 7, #ifdef/#endif section 82 instructs compiler section 79 to compile source code 83 in a case that parameters 80 specify that a number of processing clusters for a target system's CPU is equal to 1. Likewise, #ifdef/#endif section 84 instructs compiler section 79 to compile source code 85 in a case that parameters 80 specify that a number of processing clusters is equal to 2, and #ifdef/#endif section 86 instructs compiler section 79 to compile source code 87 in a case that parameters 80 specify that a number of processing clusters is equal to 3.

Thus, depending on the parameters, different source code is compiled from the library provided by the manufacturer. As a result, the executable can be customized for a particular type of processor by simply setting parameters 80. For example, a parameter specifying a target system with a CPU having a given number of processing clusters can result in compilation of code for that CPU configuration. Likewise, a parameter specifying register partitioning information can result in compilation of code for a corresponding command set.

Other conditional compilation sections can be included in decrypted source code 78, and the sections need not test for a number of processing clusters or for register partitioning information. Rather, the sections can test for any other properties of target system 71 which affect what binary code will run on the target system.

Figure 8:
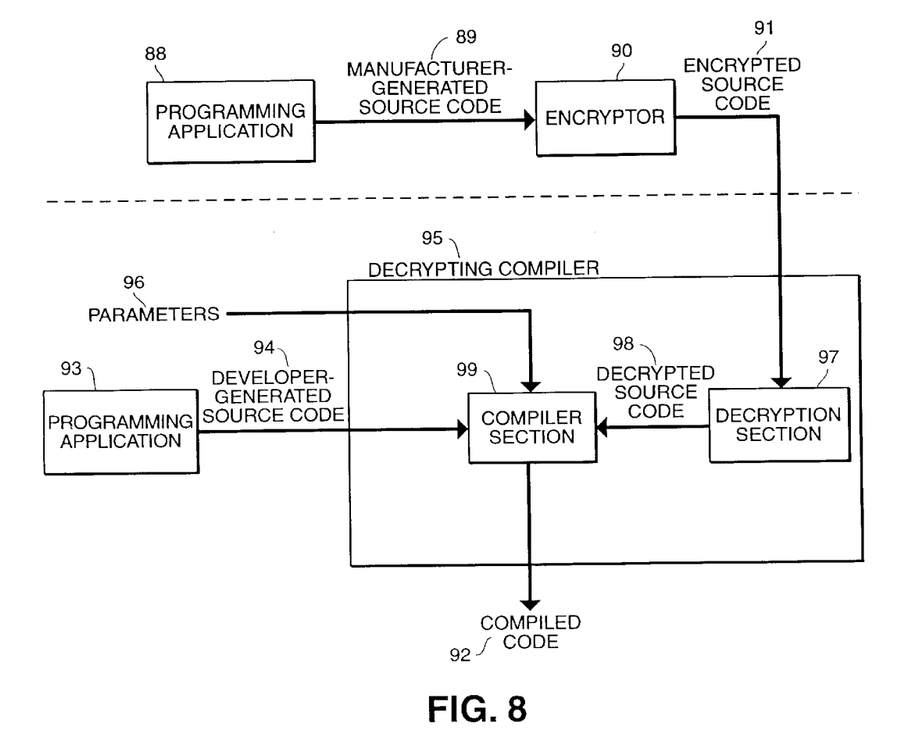
FIG. 8 is a representative view illustrating another embodiment of the invention.

In an alternative embodiment illustrated in FIG. 8, the manufacturer-generated source code need not be in the form of a library. Rather, the manufacturer-generated source code may be any type source code, for example stand-alone header information containing data such as proprietary color correction tables or stand-alone macros. Thus, any type of source code can be provided by the manufacturer.

Furthermore, the compiler need not generate linkable objects, but rather can generate any type of compiled code, for example a complete executable. In order to generate a complete executable, the compiler could use inline compilation techniques to compile functions, macros and other elements from decrypted manufacturer-generated source code into developer-generated source code.

Thus, as shown in FIG. 8, a manufacturer uses programming application 88 to generate manufacturer-generated source code 89, which can comprise header information, macros, instructions and the like. This source code also can include conditional compilation statements which can be used to customize compilation of the source code for one of plural different types of processors, as discussed above with reference to FIGS. 6 and 7.

Manufacturer-generated source code 89 is input to encryptor 90, and encryptor 90 outputs encrypted source code 91. In the preferred embodiment, encryptor 90 uses either a single-key encryption algorithm or a public/private encryption algorithm. The encrypted source code is provided for use by a third-party software developer in generating compiled code 92, for example through a network interface or on a computer-readable storage medium.

The software developer uses programming application 93 to author developer-generated source code 94, which is plain text source code. This developer-generated source code utilizes functions and/or data provided by the manufacturer in manufacturer-generated source code 89. The third-party developer writes calls to these functions or accesses the data using names and parameters provided by the manufacturer, for example through #include statements. Thus, the code written by the third-party developer can utilize the functions and data, without the developer ever having access to plain text for manufacturer-generated source code 89.

Developer-generated source code 94 is input to decrypting compiler 95, along with encrypted source code 91. One or more parameters 96 provided by the third-party developer in accordance with a designated target system also are input to decrypting compiler 95. These parameters preferably specify a CPU-type of a target system. The decrypting compiler generates compiled code 92 from these inputs.

In more detail, decryption section 97 of decrypting compiler 95 decrypts encrypted source code 91 using an appropriate key. If encryptor 90 utilizes a single-key encryption algorithm, then decryption section 97 utilizes the same key as was used by encryptor 90 to encrypt encrypted source code 91. If encryptor 90 utilizes a public/private key algorithm, then decryption section 97 utilizes the private key corresponding to the public key used by encryptor 90.

Decrypted source code 98 is fed to compiler section 99, along with developer-generated source code 94 and parameters 96. Preferably, the decrypted source code is not swapped out to a mass storage device during this operation. Instead, the decrypted source code preferably resides solely in main memory of a computer system on which decrypting compiler 95 is running, thereby limiting access to the decrypted source code.

Compiler section 99 compiles developer-generated source code 94 with decrypted source code 98 from decryption section 97 so as to generate compiled code 92. Compiler section 99 preferably utilizes parameters 96 so as to selectively compile portions of decrypted source code 98, thereby producing compiled code 92. This compiled code can be a set of linkable binary objects, a linkable library, an executable, or any other form of compiled code.

For example, if manufacturer-generated source code 89 is source code for a library, then library functions called by developer-generated source code 94 can be compiled into compiled code 92. If manufacturer-generated source code 89 contains header information with implementations of functions for inline compilation (e.g., through macro definitions), then compiler section 99 can compile the functions inline with developer-generated source code 94, leading to more efficient compiled code 92. In any event, proprietary information contained in manufacturer-generated source code 89 is protected.

By virtue of the foregoing arrangements, a third-party developer can specify a parameter, such as a number of processing clusters or register partitioning information, provide source code that accesses encrypted source code (e.g., an encrypted library) provided by a manufacturer, and compile an executable for a target system, all while any proprietary information contained in the encrypted source code is protected.

It is, of course, possible for a manufacturer also to supply non-encrypted source code for use by a software developer. Such code can be input to a decrypting compiler according to the invention along with the developer-generated source code and encrypted source code. Likewise, conventional binary libraries can be supplied by the manufacturer for linking with compiled code produced by a decrypting compiler according to the invention. Other variations exist wherein decrypted code is compiled with plain-text code. Accordingly, while the invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A decrypting compiler comprising:
   a first input section for inputting encrypted source code;
   a second input section for inputting plain text source code;
   a decrypting section that decrypts the encrypted source code into plain text decrypted source code; and
   a compiling section that compiles the plain text input by the second input section and the plain text source code decrypted by the decrypting section, so as to produce compiled code therefrom,
   wherein the encrypted source code input by the first input section is produced by a software manufacturer, and wherein the plain text source code input by the second input section is produced by a third-party software developer different from the software manufacturer.

2. A decrypting compiler according to claim 1, wherein the encrypted source code comprises encrypted source code instructions.

3. A decrypting compiler according to claim 1, wherein the encrypted source code comprises encrypted source code header information.

4. A decrypting compiler according to claim 1, wherein the encrypted source code comprises encrypted macros.

5. A decrypting compiler according to claim 1, wherein the encrypted source code input by the first input section includes proprietary information.

6. A decrypting compiler according to claim 1, wherein the decrypting section decrypts the encrypted source code into plain text that is not accessible outside the compiler.

7. A decrypting compiler according to claim 6, wherein the decrypting section produces plain text using a proprietary single-key encryption/decryption algorithm.

8. A decrypting compiler according to claim 6, wherein the decrypting section produces plain text using a public key/private key encryption algorithm, with the private key being embedded in the decrypting compiler.

9. A decrypting compiler according to claim 1, further comprising a parameter input section for inputting a parameter for selective compilation of the decrypted plain text, wherein the compiling section is responsive to compiler directives keyed to the input parameter so as to selectively compile different sections of source code.

10. A decrypting compiler according to claim 9, wherein the input parameter comprises information of a number of processing clusters for a target system's CPU, and wherein the compiled code is for a corresponding very long instruction word command set.

11. A decrypting compiler according to claim 9, wherein the input parameter comprises register partitioning information.

12. A decrypting compiler according to claim 9, wherein the input parameter comprises any information which characterizes a target system in a way which affects what code will execute on the target system.

13. A decrypting compiler according to claim 1, wherein the compiling section compiles the decrypted source code inline with the plain text source code.

14. A decrypting compiler according to claim 1, wherein the compiled code comprises linkable binary objects.

15. A decrypting compiler according to claim 1, wherein the compiled code comprises an executable object.

16. A system for generating an executable for a target device, comprising:
   a first input section for inputting encrypted source code;
   a second input section for inputting plain text source code;
   a decrypting section that decrypts the encrypted source code into plain text decrypted source code;

a compiling section that compiles the plain text input by the second input section and the plain text source code decrypted by the decrypting section, so as to produce linkable binary objects; and a linker that links the linkable binary objects produced by the compiling section so as to generate the executable, wherein the encrypted source code input by the first input section is produced by a software manufacturer, and wherein the plain text source code input by the second input section is produced by a third-party software developer different from the software manufacturer.

17. An apparatus for compiling source code, comprising:
a memory including a region for storing executable process steps;
and a processor for executing the executable process steps, the executable process steps including:
  (a) a first input step for inputting encrypted source code;
  (b) a second input step for inputting plain text source code;
  (c) a decrypting step that decrypts the encrypted source code into plain text decrypted source code; and
  (d) a compiling step that compiles the plain text input by the second input step and the plain text source code decrypted by the decrypting step, so as to produce compiled code therefrom,
wherein the encrypted source code input by the first input step is produced by a software manufacturer, and wherein the plain text source code input by the second input step is produced by a third-party software developer different from the software manufacturer.

18. An apparatus according to claim 17, wherein the encrypted source code comprises encrypted source code instructions.

19. An apparatus according to claim 17, wherein the encrypted source code comprises encrypted source code header information.

20. An apparatus according to claim 17, wherein the encrypted source code comprises encrypted macros.

21. An apparatus according to claim 17, wherein the encrypted source code input by the first input step includes proprietary information.

22. An apparatus according to claim 17, wherein the decrypting step decrypts the encrypted source code into plain text that is not accessible outside the decrypting step and the compiling step.

23. An apparatus according to claim 22, wherein the decrypting step produces plain text using a proprietary single-key encryption/decryption algorithm.

24. An apparatus according to claim 22, wherein the decrypting step produces plain text using a public key/private key encryption algorithm, with the private key being embedded in the decrypting compiler.

25. An apparatus according to claim 17, wherein the executable process steps further comprise a parameter input step for inputting a parameter for selective compilation of the decrypted plain text, and wherein the compiler step is responsive to compiler directives keyed to the input parameter so as to selectively compile different sections of source code.

26. An apparatus according to claim 25, wherein the input parameter comprises information of a number of processing clusters for a target system's CPU, and wherein the compiled code is for a corresponding very long instruction word command set.

27. An apparatus according to claim 25, wherein the input parameter comprises register partitioning information.

28. An apparatus according to claim 25, wherein the input parameter comprises any information which characterizes a target system in a way which affects what code will execute on the target system.

29. An apparatus according to claim 17, wherein the compiling step compiles the decrypted source code inline with the plain text source code.

30. An apparatus according to claim 17, wherein the compiled code comprises linkable binary objects.

31. An apparatus according to claim 17, wherein the compiled code comprises an executable object.

32. An apparatus for generating an executable for a target device, comprising:
a memory including a region for storing executable process steps; and
a processor for executing the executable process steps, the executable process steps including: (a) a first input step for inputting encrypted source code; (b) a second input step for inputting plain text source code; (c) a decrypting step that decrypts the encrypted source code into plain text decrypted source code; (d) a compiling step that compiles the plain text input by the second input step and the plain text source code decrypted by the decrypting step, so as to produce linkable binary objects; and (e) a linking step that links the linkable binary objects produced by the compiling step so as to generate the executable,
wherein the encrypted source code input by the first input step is produced by a software manufacturer, and wherein the plain text source code input by the second input step is produced by a third-party software developer different from the software manufacturer.

33. Computer-executable process steps stored on a computer-readable medium, the computer executable process steps for compiling source code, the computer-executable process steps comprising:
first input code for inputting encrypted source code;
second input code for inputting plain text source code;
decrypting code that decrypts the encrypted source code into plain text decrypted source code; and
compiling code that compiles the plain text input by the second input code and the plain text source code decrypted by the decrypting code, so as to produce compiled code therefrom,
wherein the encrypted source code input by the first input code is produced by a software manufacturer, and wherein the plain text source code input by the second input code is produced by a third-party software developer different from the software manufacturer.

34. Computer-executable process steps according to claim 33, wherein the encrypted source code comprises encrypted source code instructions.

35. Computer-executable process steps according to claim 33, wherein the encrypted source code comprises encrypted source code header information.

36. Computer-executable process steps according to claim 33, wherein the encrypted source code comprises encrypted macros.

37. Computer-executable process steps according to claim 33, wherein the encrypted source code input by the first input code includes proprietary information.

38. Computer-executable process steps according to claim 33, wherein the decrypting code decrypts the encrypted source code into plain text that is not accessible outside the decrypting code and the compiling code.

39. Computer-executable process steps according to claim 38, wherein the decrypting code produces plain text using a proprietary single-key encryption/decryption algorithm.

40. Computer-executable process steps according to claim 38, wherein the decrypting code produces plain text using a public key/private key encryption algorithm, with the private key being embedded in the decrypting compiler.

41. Computer-executable process steps according to claim 33, wherein the executable process steps further comprise parameter input code for inputting a parameter for selective compilation of the decrypted plain text, and wherein the compiler code is responsive to compiler directives keyed to the input parameter so as to selectively compile different sections of source code.

42. Computer-executable process steps according to claim 41, wherein the input parameter comprises information of a number of processing clusters for a target system's CPU, and wherein the compiled code is for a corresponding very long instruction word command set.

43. Computer-executable process steps according to claim 41, wherein the input parameter comprises register partitioning information.

44. Computer-executable process steps according to claim 41, wherein the input parameter comprises any information which characterizes a target system in a way which affects what code will execute on the target system.

45. Computer-executable process steps according to claim 33, wherein the compiling code compiles the decrypted source code inline with the plain text source code.

46. Computer-executable process steps according to claim 33, wherein the compiled code comprises linkable binary objects.

47. Computer-executable process steps according to claim 33, wherein the compiled code comprises an executable object.

48. Computer-executable process steps stored on a computer-readable medium, the computer executable process steps for generating an executable for a target device, the computer-executable process steps comprising:
   first input code for inputting encrypted source code;
   second input code for inputting plain text source code;
   decrypting code that decrypts the encrypted source code into plain text decrypted source code;
   compiling code that compiles the plain text input by the second input code and the plain text source code decrypted by the decrypting code, so as to produce linkable binary objects; and
   linking code that links the linkable binary objects produced by the compiling code so as to generate the executable,
   wherein the encrypted source code input by the first input code is produced by a software manufacturer, and wherein the plain text source code input by the second input code is produced by a third-party software developer different from the software manufacturer.

49. A computer-readable medium which stores computer-executable process steps, the computer-executable process steps for compiling source code, the computer-executable process steps comprising:
   a first input step for inputting encrypted source code;
   a second input step for inputting plain text source code;
   a decrypting step that decrypts the encrypted source code into plain text decrypted source code; and
   a compiling step that compiles the plain text input by the second input step and the plain text source code decrypted by the decrypting step, so as to produce compiled code therefrom,
   wherein the encrypted source code input by the first input step is produced by a software manufacturer, and wherein the plain text source code input by the second input step is produced by a third-party software developer different from the software manufacturer.

50. A computer-readable medium according to claim 49, wherein the encrypted source code comprises encrypted source code instructions.

51. A computer-readable medium according to claim 49, wherein the encrypted source code comprises encrypted source code header information.

52. A computer-readable medium according to claim 49, wherein the encrypted source code comprises encrypted macros.

53. A computer-readable medium according to claim 49, wherein the encrypted source code input by the first input step includes proprietary information.

54. A computer-readable medium according to claim 49, wherein the decrypting step decrypts the encrypted source code into plain text that is not accessible outside the decrypting step and the compiling step.

55. A computer-readable medium according to claim 54, wherein the decrypting step produces plain text using a proprietary single-key encryption/decryption algorithm.

56. A computer-readable medium according to claim 54, wherein the decrypting step produces plain text using a public key/private key encryption algorithm, with the private key being embedded in the decrypting compiler.

57. A computer-readable medium according to claim 49, wherein the executable process steps further comprise a parameter input step for inputting a parameter for selective compilation of the decrypted plain text, and wherein the compiler step is responsive to compiler directives keyed to the input parameter so as to selectively compile different sections of source code.

58. A computer-readable medium according to claim 57, wherein the input parameter comprises information of a number of processing clusters for a target system's CPU, and wherein the compiled code is for a corresponding very long instruction word command set.

59. A computer-readable medium according to claim 57, wherein the input parameter comprises register partitioning information.

60. A computer-readable medium according to claims 57, wherein the input parameter comprises any information which characterizes a target system in a way which affects what code will execute on the target system.

61. A computer-readable medium according to claim 49, wherein the compiling step compiles the decrypted source code inline with the plain text source code.

62. A computer-readable medium according to claim 49, wherein the compiled code comprises linkable binary objects.

63. A computer-readable medium according to claim 49, wherein the compiled code comprises an executable object.

64. A computer-readable medium which stores computer-executable process steps, the computer-executable process steps for generating an executable for a target device, the computer-executable process steps comprising:
   a first input step for inputting encrypted source code;
   a second input step for inputting plain text source code;
   a decrypting step that decrypts the encrypted source code into plain text decrypted source code;
   a compiling step that compiles the plain text input by the second input step and the plain text source code decrypted by the decrypting step, so as to produce linkable binary objects; and
   a linking step that links the linkable binary objects produced by the compiling step so as to generate the executable, wherein the encrypted source code input by the first input step is produced by a software manufacturer, and wherein the plain text source code input by the second input step is produced by a third-party software developer different from the software manufacturer.

65. An apparatus for compiling source code, comprising:

first input means for inputting encrypted source code;

second input means for inputting plain text source code;

decrypting means for decrypting the encrypted source code into plain text decrypted source code; and compiling means for compiling the plain text input by the second input means and the plain text source code decrypted by the decrypting means, so as to produce compiled code therefrom, wherein the encrypted source code input by the first input means is produced by a software manufacturer, and wherein the plain text source code input by the second input means is produced by a third-party software developer different from the software manufacturer.

66. An apparatus according to claim 65, wherein the encrypted source code comprises encrypted source code instructions.

67. An apparatus according to claim 65, wherein the encrypted source code comprises encrypted source code header information.

68. An apparatus according to claim 65, wherein the encrypted source code comprises encrypted macros.

69. An apparatus according to claim 65, wherein the encrypted source code input by the first input means includes proprietary information.

70. An apparatus according to claim 65, wherein the decrypting means decrypts the encrypted source code into plain text that is not accessible outside the decrypting means and the compiling means.

71. An apparatus according to claim 70, wherein the decrypting means produces plain text using a proprietary single-key encryption/decryption algorithm.

72. An apparatus according to claim 70, wherein the decrypting means produces plain text using a public key/private key encryption algorithm, with the private key being embedded in the decrypting compiler.

73. An apparatus according to claim 65, further comprising a parameter input means for inputting a parameter for selective compilation of the decrypted plain text, and wherein the compiler means is responsive to compiler directives keyed to the input parameter so as to selectively compile different sections of source code.

74. An apparatus according to claim 73, wherein the input parameter comprises information of a number of processing clusters for a target system's CPU, and wherein the compiled code is for a corresponding very long instruction word command set.

75. An apparatus according to claim 73, wherein the input parameter comprises register partitioning information.

76. An apparatus according to claim 73, wherein the input parameter comprises any information which characterizes a target system in a way which affects what code will execute on the target system.

77. An apparatus according to claim 65, wherein the compiling means compiles the decrypted source code inline with the plain text source code.

78. An apparatus according to claim 65, wherein the compiled code comprises linkable binary objects.

79. An apparatus according to claim 65, wherein the compiled code comprises an executable object.

80. An apparatus for generating an executable for a target device, comprising:

first input means for inputting encrypted source code;

second input means for inputting plain text source code;

decrypting means for decrypting the encrypted source code into plain text decrypted source code;

compiling means for compiling the plain text input by the second input means and the plain text source code decrypted by the decrypting means, so as to produce linkable binary objects; and linking means for linking the linkable binary objects produced by the compiling means so as to generate the executable, wherein the encrypted source code input by the first input means is produced by a software manufacturer, and wherein the plain text source code input by the second input means is produced by a third-party software developer different from the software manufacturer.

81. A decrypting compiler comprising:

a first input section for inputting encrypted source code;

a second input section for inputting plain text source code;

a decrypting section that decrypts the encrypted source code into plain text decrypted source code; and a compiling section that compiles the plain text input by the second input section and the plain text source code decrypted by the decrypting section, so as to produce compiled code therefrom, wherein the encrypted source code input by the first input section is produced by a first provider, and wherein the plain text source code input by the second input section is produced by a second provider different from the first provider.

82. Computer-executable process steps stored on a computer-readable medium, the computer executable process steps for compiling source code, the computer-executable process steps comprising:

first input code for inputting encrypted source code;

second input code for inputting plain text source code;

decrypting code that decrypts the encrypted source code into plain text decrypted source code; and compiling code that compiles the plain text input by the second input code and the plain text source code decrypted by the decrypting code, so as to produce compiled code therefrom, wherein the encrypted source code input by the first input code is produced by a first provider, and wherein the plain text source code input by the second input code is produced by a second provider different from the first provider.

* * * * *